United States Patent
Schoebrechts (10) Patent No.: US 11,594,890 B2
(45) Date of Patent: Feb. 28, 2023

(54) PROTECTION SYSTEM FOR LIMITING AN IMPACT OF DISRUPTIONS OF AN EXTERNAL ELECTRICAL NETWORK ON A LOCAL NETWORK

(71) Applicant: KS RESEARCH, SOCIÉTÉ ANONYME, Battice (BE)

(72) Inventor: Jacques Schoebrechts, Battice (BE)

(73) Assignee: KS RESEARCH, SOCIÉTÉ ANONYME, Battice (BE)

(*) Notice: Subject to any disclaimer, the term of this patent is extended or adjusted under 35 U.S.C. 154(b) by 315 days.

(21) Appl. No.: 16/646,265

(22) PCT Filed: Sep. 11, 2018

(86) PCT No.: PCT/IB2018/056920
§ 371 (c)(1),
(2) Date: Mar. 11, 2020

(87) PCT Pub. No.: WO2019/049102
PCT Pub. Date: Mar. 14, 2019

(65) Prior Publication Data
US 2020/0287387 A1    Sep. 10, 2020

(30) Foreign Application Priority Data
Sep. 11, 2017   (BE) .................................. 2017/5644

(51) Int. Cl.
H02J 3/00         (2006.01)
H02J 3/38         (2006.01)
H02H 1/00         (2006.01)
H02H 7/26         (2006.01)
H02J 3/24         (2006.01)
(Continued)

(52) U.S. Cl.
CPC ........... *H02J 3/381* (2013.01); *H02H 1/0061* (2013.01); *H02H 7/261* (2013.01); *H02J 3/24* (2013.01);
(Continued)

(58) Field of Classification Search
CPC ........ H02J 3/24; H02J 3/28; H02J 3/30; H02J 3/381
See application file for complete search history.

(56) References Cited

U.S. PATENT DOCUMENTS 6,023,152 A    2/2000 Briest et al.
8,295,063 B2 * 10/2012 Gong ...................... H02M 1/12
                                                   363/40
(Continued)

FOREIGN PATENT DOCUMENTS

DE    19857754 C1    9/2000
EP    1126576 A2     8/2001
(Continued)

OTHER PUBLICATIONS

International Preliminary Report on Patentability dated Jan. 3, 2020, from corresponding PCT application No. PCT/IB2018/056920.
(Continued)

*Primary Examiner* — Adi Amrany
(74) *Attorney, Agent, or Firm* — Nixon & Vanderhye (57) ABSTRACT

Protection system for limiting the impact of disruptions of an external urban or industrial electrical network on a local electrical network of a site which is connected to the external network and which includes at least one local electric power source, referred to as "local source" connected to the local network and capable of injecting the surplus electric power into the external network, with the protection system including a synchronous machine connected to the local network which is itself connected to the external network by way of a choke, referred to as "network choke." The protection system includes at least a local choke which is associated with the local source and which is connected to the local network between this local source and the synchronous machine.

19 Claims, 5 Drawing Sheets

(51) Int. Cl.
*H02J 9/06* (2006.01)
*H02J 3/30* (2006.01)

(52) U.S. Cl.
CPC ............... *H02J 9/066* (2013.01); *H02J 3/30* (2013.01); *H02J 2300/20* (2020.01); *H02J 2300/24* (2020.01); *H02J 2300/28* (2020.01); *H02J 2310/20* (2020.01)

(56) References Cited

U.S. PATENT DOCUMENTS

| | | |
|---|---|---|
| 2001/0009338 A1 | 7/2001 | Reutere |
| 2005/0139259 A1* | 6/2005 | Steigerwald ............ H02J 3/383 136/244 |
| 2005/0236838 A1* | 10/2005 | Rosebrock ................ H02J 3/40 290/44 |
| 2009/0296434 A1* | 12/2009 | De Rooij .......... H02M 7/53871 363/71 |

FOREIGN PATENT DOCUMENTS

| | | |
|---|---|---|
| EP | 1533884 A1 | 5/2005 |
| EP | 1589630 A2 | 10/2005 |
| GB | 1309858 A | 3/1973 |

OTHER PUBLICATIONS

International Search Report, dated Oct. 25, 2018, from corresponding PCT application No. PCT/IB2018/056920.

* cited by examiner

PRIOR ART

*Fig.1A*

PRIOR ART

PROTECTION SYSTEM FOR LIMITING AN IMPACT OF DISRUPTIONS OF AN EXTERNAL ELECTRICAL NETWORK ON A LOCAL NETWORK

BACKGROUND OF THE INVENTION

Field of the Invention

The invention relates to a protection system for limiting the impact of the disruptions of an external urban or industrial electrical network on the local network of a site connected to the external network.

The invention relates more specifically to a protection system for limiting the impact of such disruptions on the machines used in a local network which is provided with at least one power source (called local source) of different origin integrated into the aforementioned network, such as wind turbines, photovoltaic panels, storage batteries or other sources of green energy, or even generators that can inject the surplus power into the urban or industrial network.

The invention is intended more specifically to limit the impact of strong disruptions on the external network which can have serious consequences on users of the local network by stopping various electrical machines, such as computers, production machines, installations and so on, used at the time of the disruption as well as on the continuity of service from local sources.

Description of the Related Art

UPS (uninterruptible power supply) protection systems already exist on the market as described in patent EP 1.533.884 or network conditioners which consist of the association of a synchronous machine with a choke in the local network and possibly a kinetic energy reserve associated directly or indirectly with the synchronous machine.

Other uninterruptible power supply systems or network conditioners are known from patents GB 1.309.858, DE 198 57 754 and U.S. Pat. No. 6,023,152, but without integration of local green power sources in the local network.

Patent application EP 1.589.630 highlights a system for regulating a wind turbine connected to an external network, but does not provide a solution for protecting a local network connected to the external network.

During normal operation of the external urban or industrial network, the synchronous machine is supplied by the external network. Therefore it operates constantly at a certain rotation speed and constitutes a kinetic energy reserve which is all the higher if it is combined to a flywheel or to an energy reserve such as an energy accumulator well known in the state of the art.

During a disruption in the external urban or industrial network, the synchronous machine stops being supplied but continues to supply the local network instantaneously thanks to its accumulated power.

In certain cases the synchronous machine can also be associated with a heat engine via a clutch which is started as soon as the local power sources alone are not sufficient to supply the local users if the urban or industrial external network disappears.

These protection systems, depending on their degree of sophistication, offer enormous advantages in terms of protecting users against various disruptions in the external urban or industrial network (such as micro-disconnections, interruptions, voltage variations, harmonics), while maintaining a short-circuit capacity compatible with the site selectivity as it had been established before the introduction of the protection system.

"Green" technologies such as photovoltaic panels, wind turbines and sometimes associated storage systems such as batteries, are generally connected to the local network by semiconductor inverters to transform the voltage of the electricity produced into a voltage compatible with the network.

In some cases, as long as "green" energy can deliver sufficient power, local network users would like to protect themselves from interruptions or major disruptions to the external network and take advantage of the green energy produced elsewhere.

For example, when a break in the external urban or industrial network is detected, the local network is automatically cut from the external network by opening contactors or circuit breakers. The time to open the circuit breakers is typically less than 100 milliseconds.

While opening the circuit breakers to isolate the local network from the site, the "green" devices must supply power to site users but also to all users who are between the location of the actual disconnection and the site network input.

Generally this power is considerable and is perceived as a short circuit on the side of the site users generating overcurrents which are sufficient to cause the shutdown of users and inverters from local sources connected to this local network.

This stems from the fact that the inverters of batteries, photovoltaic panels, and in some cases even wind turbines, do not have the capacity to supply sufficient current peaks to maintain an acceptable voltage for the site's local network, while supplying the external urban or industrial network during the opening time of the circuit breakers that connect the local network to the defective external network.

At the same time, the voltage at the local network input drops to a value close to 0 volts by the effect of the short circuit, which causes the shutdown of the electrical systems connected to the local network.

Another uninterruptible power supply device (UPS) is highlighted in document EP 1.126.576, with the device comprising a standard generator, whose subtransient reactance is typically around 12 to 20%, associated with an inverter to the ultra-fast IGBT ("Isolated Gate Bipolar Transistor") inverter, i.e. with a response time of around one millisecond, in the context of a well-known configuration and an intermediate hold choke.

On the other hand, in dynamic UPSs, synchronous machines with low subtransient reactance are generally used, the value of which is 4 to 7% to obtain, in combination with a choke with intermediate tap, a good improvement in terms of the voltage on the load when the current has a high harmonic rate and also to be able to cope with short circuits which occur on the network as on the load side. Short-circuits on the upstream network cause a voltage drop at the output, the higher the longer the opening time of the cut-off device between the network and the UPS.

In document EP 1.126.576, thanks to its response speed (intra-period) the IGBT inverter makes it possible to instantly correct the waveform of the UPS output voltage and in principle does not require a synchronous machine with low reactance to achieve this improvement, resulting in a lower UPS production cost, because of the lower cost of the standard generator compared to the price of a synchronous machine with low reactance and of the same power.

In addition, thanks to the inverter, this device makes it possible to provide part of the reactive power which is absorbed by the network when its voltage is lower than the load voltage without overloading the synchronous machine.

The fact of using in patent EP 1.126.576 a generator with a high reactance leads to the use of a choke with an intermediate hold choke whose branch located on the network side at a relatively high value, for example from 50 to 70%, which could lead to instability of the system, especially in the event of a short circuit on the downstream loads, given the current limitations typical of semiconductor inverters.

If quick-opening switches (opening time of the order of 10 milliseconds), based on semiconductors such as static switches are used, this may protect the loads from a sudden short circuit on the network, the use of a standard synchronous machine, because of its high subtransient reactance compared to the low subtransient reactance of the machines used in most dynamic UPS, will not prevent the damaging impact of a short circuit downstream because the associated inverter, in view of its intrinsic current limitation, will not be able to supply it in this case.

With regard to the various local sources mentioned in EP 1.126.576, these are all direct current sources which are located upstream of the inverter without any possibility of avoiding mutual disruptions if a fault occurs on any of them since they are directly interconnected with each other.

SUMMARY OF THE INVENTION

The purpose of the invention is to avoid one or more of the above-mentioned drawbacks by presenting a protection system that makes it possible to reliably and adequately associate local sources of power of various origins with an external urban or industrial network while guaranteeing continuity and quality of power for users, whether if there is a short circuit or a current draw on the network side or a fault on one of the local sources.

This purpose is achieved according to the invention by a protection system for limiting the impact of disruptions of an external urban or industrial electrical network on a local electrical network of a site which is connected to the external network and which comprises at least one local electric power source, referred to as "local source" connected to the local network and capable of injecting the surplus electric power into the external network, with the protection system comprising a synchronous machine connected to the local network which is itself connected to the external network via a choke, known as a "network choke", characterized in that the protection system comprises at least one local choke which is associated with the local source and which is connected to the local network between the above local source and the synchronous machine.

The chokes act as a buffer, the aim of which is to limit the current injected towards the external urban or industrial network in the event of a disconnection on the external network and at the same time to limit the current supplied by the local power source or sources. This has the effect that the voltage drop in the local network during an external network electrical failure is limited, so that the local network's electrical systems do not fail.

In this way, the electric power developed by the synchronous machine and by the local power source(s) is mainly used to supply local network users in the first moments of the external network failure, while the local network is isolated from the external network by opening the network circuit breakers.

Among the different electric power sources connected to the local network are photovoltaic panels, wind turbines, batteries or other accumulators of electric power, generators and other sources which can operate in cogeneration of power in the local network.

The synchronous machine used is preferably a machine with low subtransient reactance preferably less than 10% of the nominal reactance of the local network or better still of around 5 to 8% of this local network nominal reactance in relation to the nominal power and nominal voltage of this local network.

Therefore, the synchronous machine has a very high short-circuit capacity during the first hundredths of seconds which correspond to the subtransient reactance time constant after the fault occurs on the external network and is therefore capable of supplying a high current of, for example, 10 times its nominal current in subtransient mode.

Indeed, a synchronous machine is characterized among other things by its subtransient reactance, which is the reactance during the first hundredths of a second; this reactance is low in this period and increases rapidly thereafter. The reactance is defined in relation to the nominal power that the synchronous machine can deliver under nominal voltage and is expressed in Ohm or as a % in the PU system (reduced unit or "Per Unit").

In the event of a current call following a momentary overload or a disruption originating from a short circuit, the voltage drop across the synchronous machine is low and, therefore, thanks to the presence of the local choke, the increase in the electric current delivered by this local source will also be small, in any case so small that the inverters will not be affected by this increase in current.

The reactance of the choke associated with the synchronous machine is greater than the direct subtransient reactance of the synchronous machine and is preferably of around 3 to 10 times the direct subtransient reactance of the synchronous machine, or better still is of around of 5 to 8 times this reactance.

The local choke reactance value is around 25 to 40% with reference to the nominal power of the local source or of the local sources which are connected to it.

The synchronous machine may usefully be mechanically coupled to a kinetic energy reserve which will extend the time during which the synchronous machine will be able to generate sufficient current for the period necessary to open the circuit breakers on the external network side in the event of a power failure in this network.

The protection system also makes it possible very usefully to combine cogeneration systems with an urban or industrial network such as a generator which operates when the power produced by local power sources is insufficient to supply users in the local network.

The generator can be connected directly to the synchronous machine or via a local choke as are the local sources.

The protection system can operate both at medium voltage and at low voltage or possibly at medium voltage with a transformed inserted into the local network and the synchronous machine.

BRIEF DESCRIPTION OF THE DRAWINGS

For greater clarity, some examples of a protection system according to the invention are described below for illustration purposes and without limitation, with reference to the appended drawings in which.

DESCRIPTION OF THE PREFERRED EMBODIMENTS

Figure 1A:
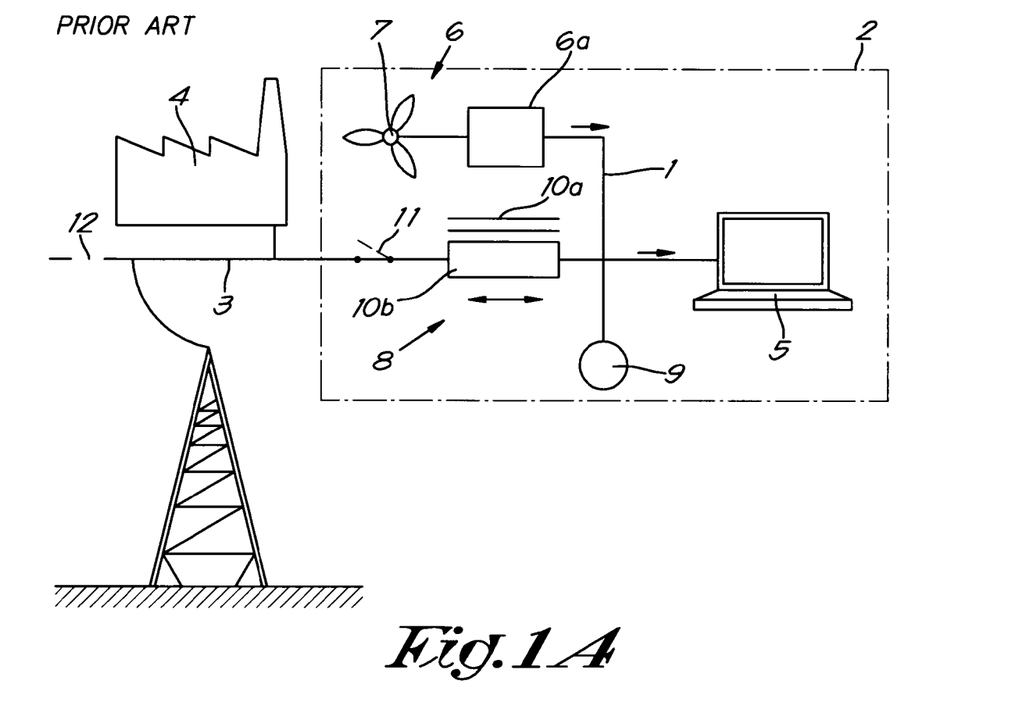
FIG. 1A is a schematic view of a known local electrical network connected to an external network in which the inverter is directly connected to the synchronous machine.

FIG. 1A shows a local network 1 known to a site 2 for example designated by the frame 2, where the local network 1 is connected to an external urban network 3 to which is connected another external site 4 represented schematically by the symbol of a factory.

In the example in FIG. 1A, site 2 comprises a number of users 5 such as for example computers, production installations, security installations or other electrical systems, which are all connected to the local electrical network 1.

The site 2 also includes a local power source 6 of different origin connected to the local network 3 via an inverter 6a.

In the case in FIG. 1A, the local source 6 is represented by a wind turbine 7, but this could be any other "green" source capable of injecting the surplus electric power not consumed by the local network 1 into the external network 3.

The local network 1 is provided with a protection system 8 known to limit the impact of disruptions on the external electrical network 3, on the local electrical network and therefore to protect users from interruptions or other major disruptions on the external network 3.

The protection system 8 in FIG. 1A comprises a synchronous machine 9, for example a UPS (uninterruptible power supply), connected to the local network 1 which is connected to the external network 3 via a simple choke 10 with a single ferromagnetic core.

Figure 1B:
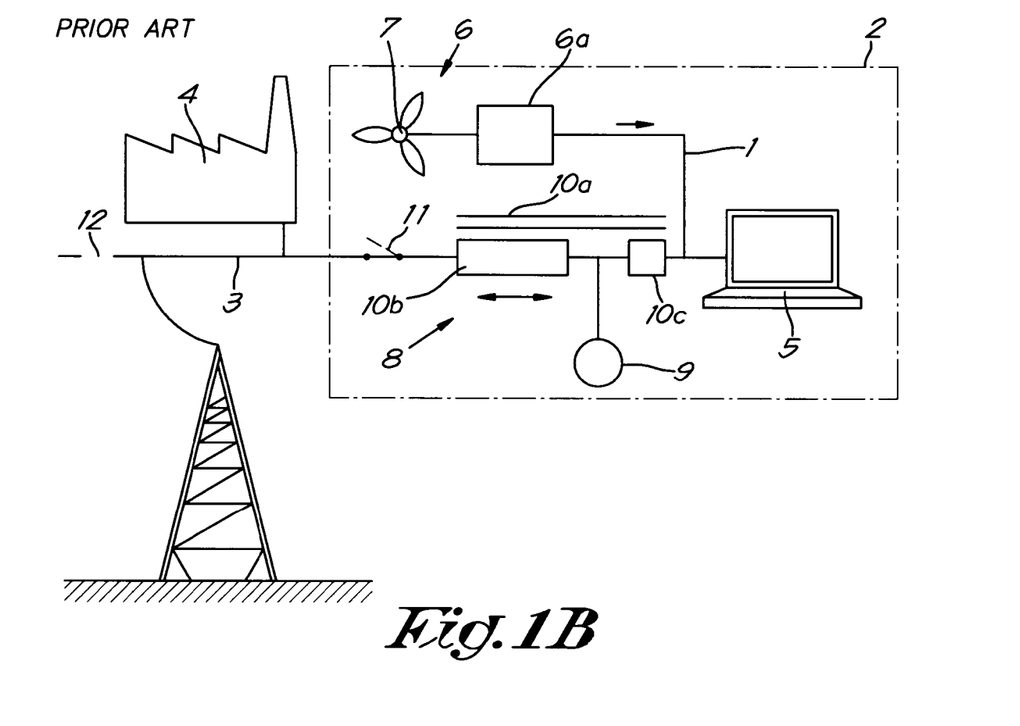
FIG. 1B shows a variant of a known local electrical network in which the synchronous machine is connected to an intermediate choke socket.

Of course, as shown in FIG. 1B, the choke 10 may also be a choke with intermediate hold with a single ferromagnetic core 10a but with two branches of coils 10b and 10c, like the one used in certain ASI systems of the state of the technique.

The local network 1 comprises a circuit breaker 11 which makes it possible to isolate the local network 1 from the external network 3 if necessary, for example during a power cut on the external network at a location 12 remote from the site.

When a disconnection in the external network 3 (FIG. 1A or 1B) is detected in the local network 1, the network 1 security systems will command the opening of circuit breaker 11 as quickly as possible.

The circuit breaker always takes a certain amount of time to open, which must not exceed 100 milliseconds.

While this circuit breaker is opening, the local network 1 remains connected to the external network 3 via the network choke 10; the synchronous machine 9 and the wind turbine 7 will supply not only the users 5 of the site, but also all the external users who are connected to the external network 3 between the entrance to the site 2 and the place 12 where the disconnection occurred, for example the users of the outdoor plant 4, which is perceived on the local network side 1 as a huge current draw only limited by the network choke 10 for the synchronous machine 9 and the local sources 6, which makes the voltage drop significantly from the local network 1 as soon as the circuit breaker 11 opening time exceeds the subtransient reactance time constant, for example 15 msec, of the synchronous machine 9.

Generally, the power which the wind turbine 7 must supply during this period is considerable and the overcurrent it generates is sufficient to cause it to stop, in particular when the wind turbines supply the users via the inverters 6a.

This is due to the fact that the inverters 6a do not have the capacity to supply sufficient current peaks to maintain a voltage acceptable to the users 5 while supplying the external network while the circuit breaker 11 opens.

Figure 2:
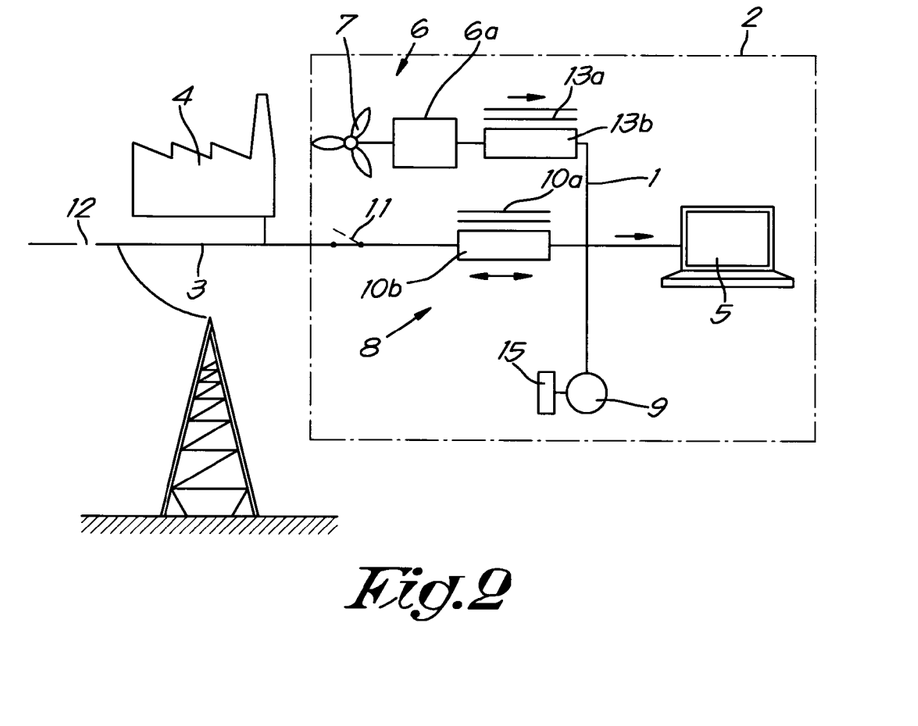
FIG. 2 shows the same network but provided with a protection system according to the invention consisting of the choke 13.

To avoid these problems, the protection system 8 is equipped according to the invention with a local choke 13 inserted between the local source 6 with the inverter 6a and the local network 1 as shown in FIG. 2

The local choke 13 is preferably a choke which has a single coil 13a around a ferromagnetic core 13b connected between the local source 6 and the synchronous machine 9. This is to protect the load 5 and the local source 6 from a short circuit or a large current draw on the network.

The synchronous machine 9 is preferably selected so that its direct subtransient reactance L9 is relatively low, for example around 5 to 8% of the local area network 1 nominal reactance in relation to the nominal power at the local network 1 nominal voltage, for example 5%.

We refer to the reactance PU (per unit or unit) of the local network 1, that is 100% for the reactance under which the local network 1 delivers its nominal current for a nominal power under a nominal voltage. The notion of a Per Unit system which expresses all the electrical quantities of a machine or an installation as a % is well known to the skilled person in the technical field considered.

The reactance L10 of the network reactor 10 associated with the synchronous machine 9 is preferably around 5 to 8 times the aforementioned subtransient reactance L9 of the synchronous machine 9, for example around 30 to 40%, 35% for instance.

The reactance L13 of the local choke 13 associated with the local source 6 is 25 to 40% of the nominal reactance L6 (in PU) of the local source 6, for example around 30%.

The protection system is used to keep local sources 6 operational by preventing them from being triggered by an overcurrent during an event which may be assimilated to a short circuit on the external network 3 and in addition helps reduce the voltage drop on the local network 1 under the same circumstances as above.

In the simplified diagram in FIG. 2, and insofar as the wind turbine 6 with its inverter 6a is able to maintain its nominal voltage and ignoring the external network 3 reactance, the voltage drop may be expressed by the following formula if we consider the values announced by way of example, that is L9=5%, L10=35%, L13=30%, and that the power of the wind turbine 6 is equal to the nominal power of the synchronous machine 9:

$$L9/(L10+(L13*L9)/(L13+L9))=5/(35+(30*5)/(30+5))$$

i.e. 12.7% or about ⅛.

Because of the small drop in voltage, the overcurrent of the current supplied by the local power source 6 will be dampened by the protection system 8 according to the invention, within the operational limits of the local circuit 1 inverters 6a.

In this case, the increase in current to be supplied by the wind turbine 6 would be 12.7/30=42.3% which remains within the possibilities of the wind turbine 6 with its inverter 6a during a circuit breaker 11 opening period of around 100 msec.

If the local choke 13 is not present, and according to the same assumptions as previously, the local source 6 should also supply, in addition to its nominal load, the total current which is injected into the upstream network (since it maintains its voltage at nominal value) or a load (100%)/L10 i.e. 100%/35%=285% of its nominal current, or almost 7 times more than when the local choke 13 is present (42.3%), which would instantly cause this local source to be put out of service and the local loads to be lost.

Figure 3:
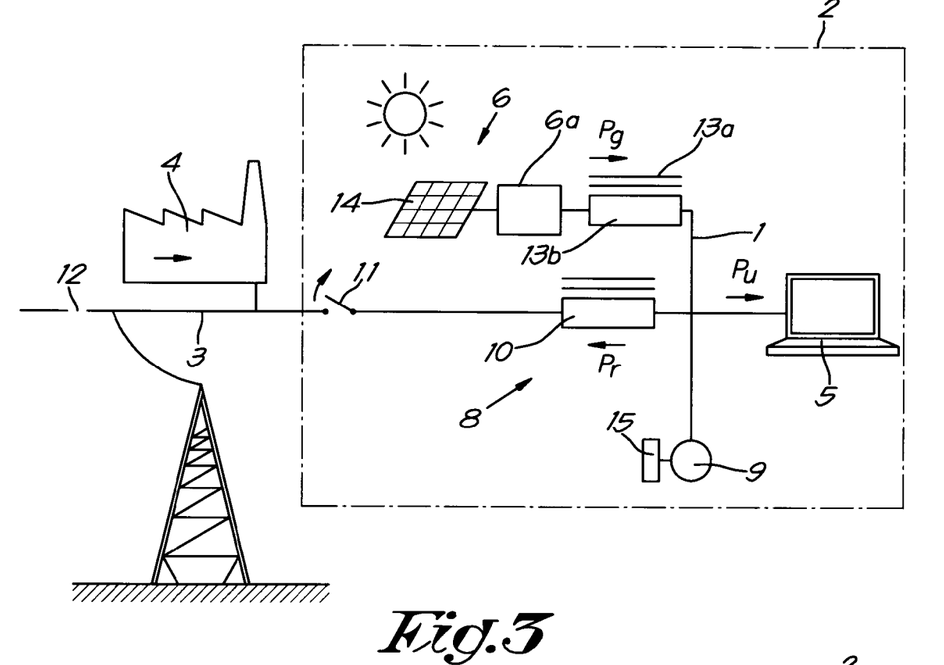
FIG. 3 shows a similar local network connected to an external network when the external network is cut off.

FIG. 3 shows a local network 1 similar to the one in FIG. 2, but in which the wind turbine 7 has been replaced by photovoltaic panels 14.

When there is a lot of sun, the power Pg supplied by the photovoltaic panels may be greater than the power Pu used by the local network 1 users 5. In this case, the surplus power Pr is returned to the external network 3.

If a fault in the external network 3 appears at location 12 at a certain distance from site 2, the voltage drops to a value close to zero Volts at the input of local network 1, at the circuit breaker 11.

The low reactance L9 synchronous machine 9 will inject a current limited by the network reactor 10 into the external network 3. The voltage drop for users 5 will therefore be limited according to the ratio between the reactance L9 of the synchronous machine 9 combined with the reactance L10 and will only last while the circuit breaker 11 opens on the side of the external network 3.

On the other hand, due to the low voltage drop across the terminals of the synchronous machine 9 and the limitation achieved by the local choke 13, the inverter 6a associated with the local source 6 will only provide a small increase in current while the external network 3 opens (<100 msec). The users 5 will therefore be protected against an event like this since there will be no loss of the local power source(s) 6.

Figure 4:
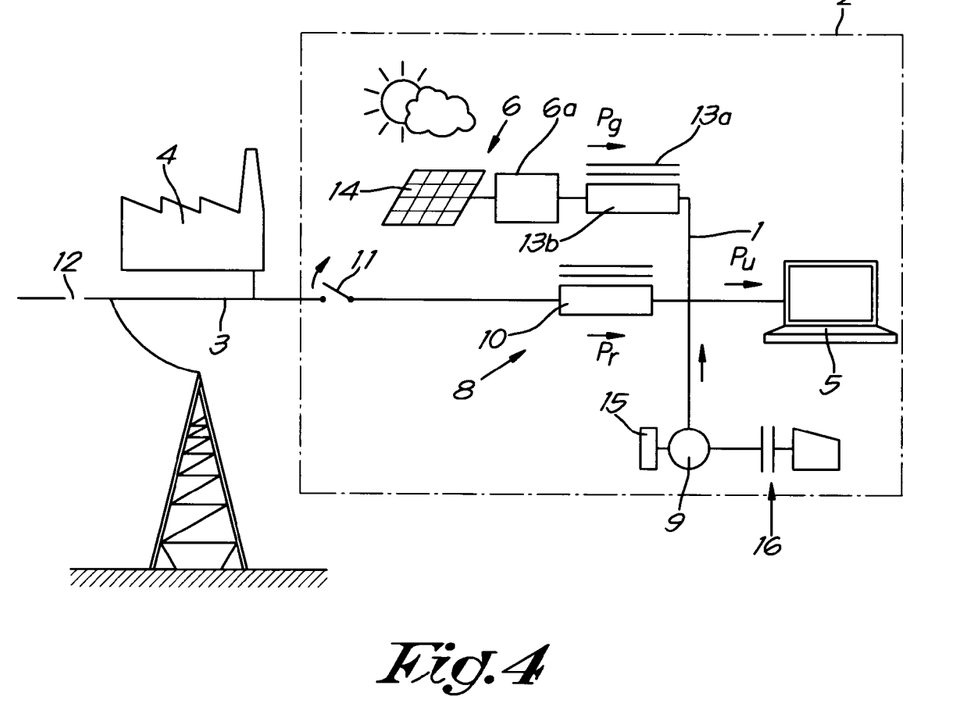
FIG. 4 shows a variant of the network in FIG. 3.

The same circuit is represented in FIG. 4 but in a situation where there is less sun and in which the power Pg supplied by the local source 6 is less than the power Pu used by the users 5: in this case part of the power Pu comes from the external network 3.

Generally, care will be taken to make the best use of the power Pg from the local "green" sources 6 in order to minimize the power Pr supplied by the external network 3.

If a network failure 3 occurs at location 12, the behavior of system 8 will be similar to the previous case during the first hundredths of a second, but since the "green" power Pg is not sufficient, the synchronous machine 9 will provide active power to users 5 while decreasing in speed, until the rapid loss of voltage.

In a case like this, an additional local power source 6 should be used, for example a kinetic energy accumulator 15 mechanically coupled to the synchronous machine 9 as shown in FIG. 4 and/or to a diesel or other engine which is started in the event of a disconnection in the external network 3, for the time required to cover the disconnection as in FIG. 3.

Figure 5:
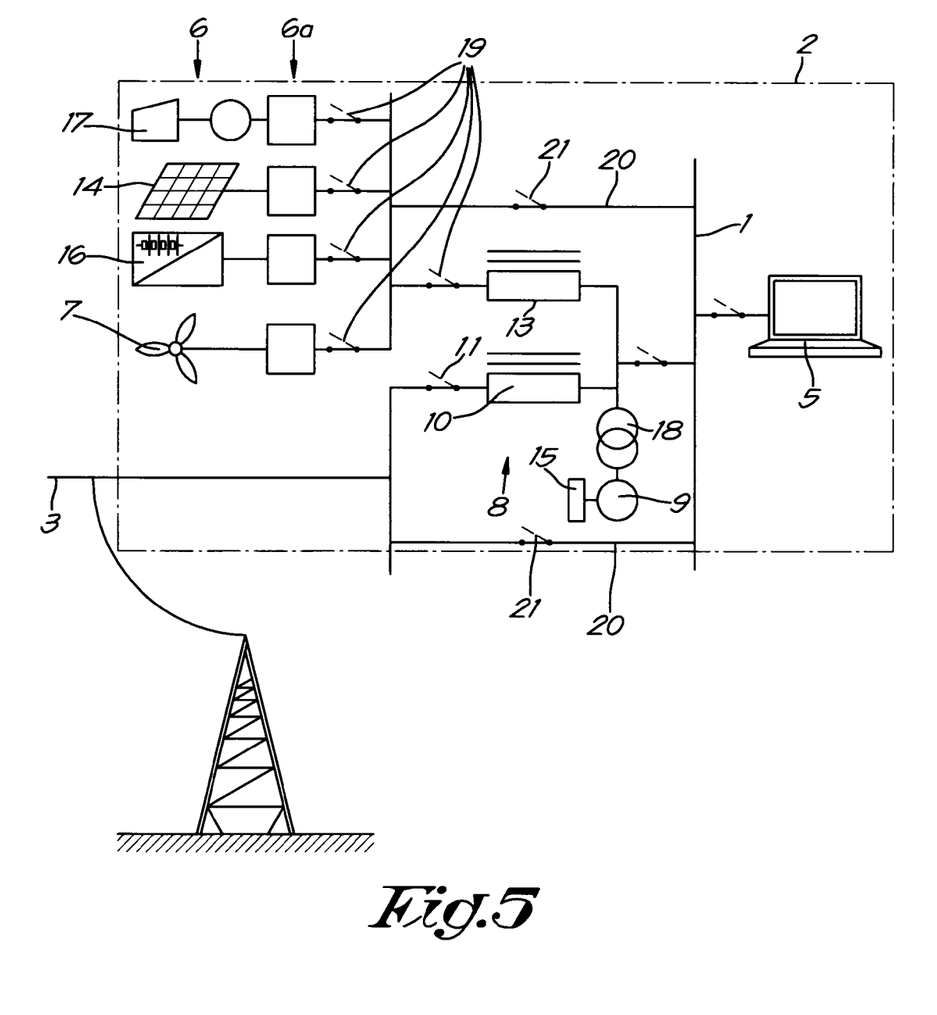
FIG. 5 shows a more elaborate network according to the invention.
Figure 6:
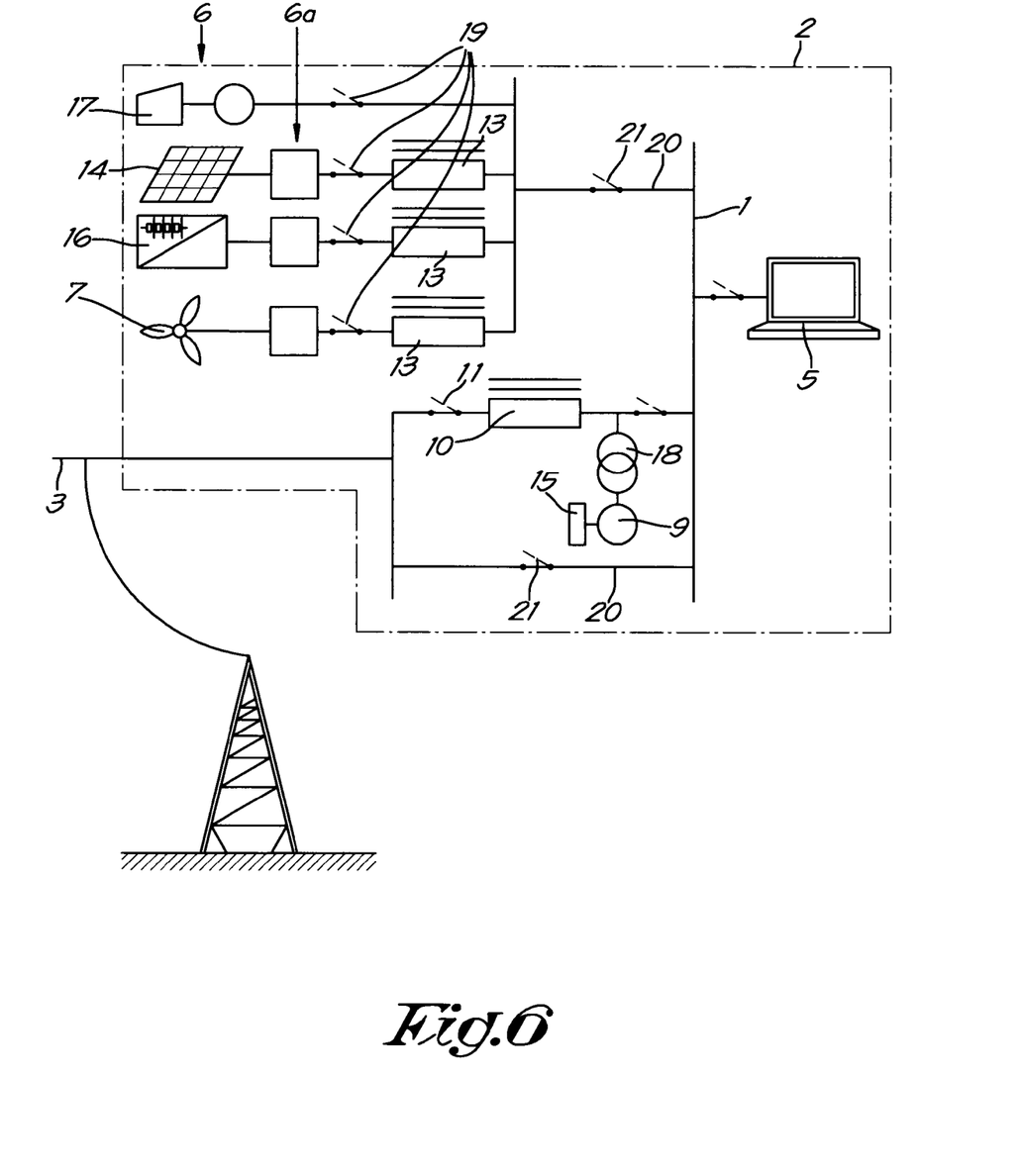
FIG. 6 shows a variant of FIG. 5 but where each of the local sources has its own local choke.

We can also associate with all of the different types of power source 6 connected simultaneously to the local network 1, as in FIG. 5, among others a wind turbine 7, photovoltaic panels 14, batteries 16 and a generator 17 or another system of cogeneration of electricity with the external network, connected directly to the synchronous machine 9 either via a single local choke 13 which is common to all the local sources 6 or some of them as in the case in FIG. 6, either via individual local chokes 13 connected directly to the synchronous machine 9 for all the local sources 6 or a part of them.

The reactance of the local choke 13 associated with all of the local power sources 6 is preferably 25 to 40% of the nominal reactance (in PU) of all of the local sources which are connected to it, or, in the case of several individual reactors each associated with one of the local sources 6, is calculated so as to produce a reactance of 25 to 40% of the nominal reactance of the associated source.

The system can operate both at medium voltage and at low voltage or possibly at medium voltage with the insertion of a transformer 18 in the branch of the synchronous machine 9.

FIGS. 5 and 6 also show the presence of several circuit breakers/switches 19 which make it possible to isolate or connect the system's local sources 6 and also show the application of two bypass connections 20, each with a switch or a circuit breaker 21, enabling the chokes 10 and 13 to be short-circuited, for example for maintenance or repair purposes.

FIGS. 2 to 5 mentioned above are not limiting as to the number of inputs and the number of chokes or synchronous machines.

The system is advantageous with all of the "green" sources connected as well as with one of the sources shown connected in isolation.

The choke 10 is a conventional choke or alternatively a choke with a known intermediate hold as in the case in FIG. 1B.

Evidently, the invention is in no way limited to the examples described above and numerous modifications may be made to the protection system according to the invention described above without departing from the scope of the invention as defined in the following claims.

The invention claimed is:

1. A protection system for limiting an impact of disruptions of an external electrical network (3) upon a local electrical network (1) of a site that is connected to the external network (3) and that is equipped with a local electric power source connected to the local network (1), the local network (1) being connected to the external network (3) so that the local network (1) is capable of injecting surplus electric power not consumed by the local network (1) into the external network (3), the protection system comprising:

a synchronous machine (9), connected to the local network (1), and also connected to the external network (3) by means of a network choke (10) that is connected directly to the local network (1), the synchronous machine (9) having a low direct subtransient reactance which is less than 10% of a nominal reactance of the local network (1); and a local choke (13) free of a capacitor in direct connection therewith which is associated with the local source (6) and for which a value of a reactance (L13), as expressed as a Per Unit ("PU") value, is 0.25 to 0.4% of a nominal reactance (L6) of the local source (6), said standalone local choke (13) connected to the local network (1) between the local source (6) and the synchronous machine (9).

2. The protection system according to claim 1, wherein the low direct subtransient reactance of the synchronous machine (9) is around 5 to 8% of the nominal reactance of the local network (1).

3. The protection system according to claim 2, wherein a value of a reactance (L10) of the network choke (10) associated with the synchronous machine (9) is around 4 to 10 times the subtransient reactance direct from the synchronous machine (9).

4. The protection system according to claim 3, wherein the local choke (13) has a single ferromagnetic core.

5. The protection system according to claim 3, wherein the synchronous machine (9) is mechanically coupled to a kinetic energy reserve (15).

6. The protection system according to claim 2, wherein the local choke (13) has a single ferromagnetic core.

7. The protection system according to claim 2, wherein the synchronous machine (9) is mechanically coupled to a kinetic energy reserve (15).

8. The protection system according to claim 2, wherein the value of a reactance (L10) of the network choke (10) associated with the synchronous machine (9), as expressed as a PU value, is 0.3 to 0.4% of a nominal reactance of the local network (1).

9. The protection system according to claim 2, wherein the value of the reactance (L10) of the network choke (10) associated with the synchronous machine (9) is around 5 to 8 times the subtransient reactance direct on the synchronous machine (9).

10. The protection system according to claim 1, wherein the local choke (13) has a single ferromagnetic core.

11. The protection system according to claim 10, wherein the synchronous machine (9) is mechanically coupled to a kinetic energy reserve (15).

12. The protection system according to claim 1, wherein the local source (6) of electric power of different origin connected to the local network (1) is one of:
- a photovoltaic panel (14),
- a wind turbine (7),
- a battery (16) or other electric power accumulator, and
- a generator (17).

13. The protection system according to claim 1, wherein the synchronous machine (9) is mechanically coupled to a kinetic energy reserve (15).

14. The protection system according to claim 1, further comprising:
- an electricity cogeneration system with the external network (3).

15. The protection system according to claim 1, wherein a generator (17) is connected directly to one of the synchronous machine (9) and the synchronous machine (9) via a choke.

16. The protection system according to claim 1, wherein the synchronous machine (9) is connected to the local network (1) via a transformer (18).

17. The protection system according to claim 1, further comprising:
- one or more additional local electric power sources of different origin, at least one of which is connected to the local network (1) by means of a choke.

18. The protection system according to claim 17, wherein the chokes of the one or more additional local electric power sources are connected in a star on the local network (1).

19. The protection system according to claim 1, further comprising:
- one or more additional local electric power sources of different origin, each of which is connected to the local network (1) by means of a choke.

* * * * *